United States Patent [19]

Thompson

[11] 4,055,519

[45] * Oct. 25, 1977

[54] SIMULTANEOUSLY FOAMED RESIN AND MAGNESIUM OXYCHLORIDE CEMENT

[75] Inventor: Henry Clark Thompson, Saratoga, Calif.

[73] Assignee: Henry Clark Thompson, Saratoga, Calif.

[*] Notice: The portion of the term of this patent subsequent to Apr. 20, 1993, has been disclaimed.

[21] Appl. No.: 678,168

[22] Filed: Apr. 19, 1976

Related U.S. Application Data

[63] Continuation-in-part of Ser. No. 397,833, Sept. 17, 1973, Pat. No. 3,951,885, which is a continuation-in-part of Ser. No. 194,557, Nov. 1, 1971, Pat. No. 3,778,304, which is a continuation-in-part of Ser. No. 811,616, March 28, 1969, abandoned, which is a continuation-in-part of Ser. No. 589,808, Oct. 27, 1966, abandoned.

[51] Int. Cl.² .................. C08G 18/14; C08K 3/22; C08J 9/00
[52] U.S. Cl. .................. 260/2.5 AK; 260/2.5 R; 260/2.5 F; 260/2.5 FP; 260/2.5 AJ
[58] Field of Search .................. 260/2.5 AK, 2.5 AJ, 260/2.5 FP, 2.5 R, 2.5 F, 2.5 B, 2.5 BE; 106/107

[56] References Cited

U.S. PATENT DOCUMENTS

| | | | |
|---|---|---|---|
| 3,211,675 | 10/1965 | Johnson | 260/2.5 AK |
| 3,238,155 | 3/1966 | Harrell | 260/2.5 F |
| 3,502,610 | 3/1970 | Thompson | 260/2.5 FP |
| 3,778,304 | 12/1973 | Thompson | 106/107 |
| 3,951,885 | 4/1976 | Thompson | 260/2.5 AK |
| 3,977,889 | 8/1976 | Shearing | 260/2.5 AM |

*Primary Examiner*—C. Warren Ivy
*Attorney, Agent, or Firm*—Limbach, Limbach & Sutton

[57] ABSTRACT

A method is described for making a fire-resistant product of simultaneously foamed magnesium oxychloride cement and synthetic resin. An example is polyurethane foam which, in the process of formation, generates sufficient heat to cure the cement-forming components. The relatively low density products have high heat resistance, unlike resin foams, making them particularly useful for building and construction purposes.

8 Claims, No Drawings

SIMULTANEOUSLY FOAMED RESIN AND MAGNESIUM OXYCHLORIDE CEMENT

CROSS-REFERENCE TO RELATED APPLICATIONS

This application is a continuation-in-part of Ser. No. 397,833 filed Sept. 17, 1973 now U.S. Pat. No. 3,951,885, issued Apr. 20, 1976, which is a continuation-in-part of Ser. No. 194,557 filed Nov. 1, 1971 now U.S. Pat. No. 3,778,304, which is a continuation-in-part of application Ser. No. 811,616, filed Mar. 28, 1969, now abandoned, which in turn is a continuation-in-part of application Ser. No. 589,808, filed Oct. 27, 1966, now abandoned.

BACKGROUND OF THE INVENTION

This invention relates to the manufacture of magnesium oxychloride cement which is foamed simultaneously with synthetic resin foam-forming ingredients. All of the patents cited in the parent applications and patents have been considered in the preparation of this application. None of those patents shows simultaneous foaming of magnesium oxychloride cement with synthetic resin foam to give a low-density fire-resistant product.

The Harrell, et al U.S. Pat. No. 3,238,155, relates to improving the water resistance of magnesium oxychloride and magnesium oxysulfide cements. There is disclosed in that patent the possibility of using a foaming agent and between 0.05 and 2 weight percent of melamine formaldehyde resin as an agent for improving the water resistance of the cement. While a foam can theoretically be prepared under that patent, it is clearly not the intent of the patent to provide a cement-resin co-foam in which the resin is at least 10% of the weight of the product.

SUMMARY OF THE INVENTION

This invention relates to a variation on that described and claimed in U.S. Pat. No. 3,951,885. In that patent, there is disclosed the combination of one to nine parts of magnesium oxychloride cement per part of synthetic resin foam. The magnesium oxychloride cement is in itself foam-forming in the parent patent because of the presence of a metal reactive with the cement-forming ingredients.

In accordance with the present invention, the foam-forming ingredient of the resin component of the co-foam is relied upon to produce all of the bubbles in the co-foam. By not using a metal reactive with the cement-forming ingredient, a somewhat higher density of the resulting product is obtained, which in some instances is a desirable property. By substituting a surfactant for the metallic frothing agent, a satisfactory co-foamed product may be obtained when the heat given off by the exothermic reaction of the resin-forming ingredients is sufficient to quickly harden the co-foam, maintaining the cement in suspension in the structure. The cement reaction is much slower, but it continues while suspended in the foamed product. If the exothermic reaction is not sufficient, additional heat will be required so that the rapid solidification may take place.

The preferred synthetic resin for making the co-foam is polyurethane. Isocyanates of either the TDI or MDI types may be reacted with a wide variety of polyols, polyesters or the like. While there is no limitation on the polyurethane-forming ingredients, it is desirable to select ingredients which result in a more strongly exothermic reaction upon forming the foam.

Also, it is desirable to use polyols which are not particularly reactive to water so that they may be combined with the aqueous magnesium chloride component of the cement-forming part before the final production of the co-foamed product. Polymeric polyol sources are especially suitable in this regard.

The selection of a foaming agent should also be made with a view towards higher temperature of operation. In most commercial applications of polyurethane foams, Freon 11 is selected as the foaming gas. However, I have found that substitution of Freon 113 gives a superior product because the temperature at which the foaming operation takes place is significantly higher. As in the parent patent, the aqueous magnesium chloride should have a specific gravity between 21.5 and 22.5° Baume and magnesium oxide should be combined with it in an amount of between 5 and 6.5 pounds magnesium oxide per gallon of magnesium chloride.

DESCRIPTION OF THE PREFERRED EMBODIMENT

The following parts by weight of cement and polyurethane ingredients were reacted together:

100: Toluene diisocyanate precursor containing 5% by weight Freon 113
138: Aromatic Amino polyol
600: Aqueous magnesium chloride at 22° Baume
332.4: Cement grade magnesium oxide
5: Surfactant
33: Expanded silica beads.

After mixing the ingredients are placed in containers to make 50 pound buns which may be sliced upon complete cure of the co-foam product.

The isocyanate forming components were commercially available urethane parts A and B from Jefferson Chemical Company under its designation No. 4864-47. The surfactant was a nonionic surfactant designated C-0880 from General Aniline and Film Co. The cement-forming components were approximately 80% of the total weight of the mixture. Upon mixing, the isocyanate and polyol react together exothermically, releasing the blowing agent within the resin (Freon 113) and initiating the reaction of the cement ingredients. At the conclusion of the reaction, a solidified co-foam results which has a high degree of fire-resistance and yet has many of the desirable properties possessed by polyurethane foam for building and construction purposes, such as high strength and low density.

I claim:

1. In a method of preparing a fireproof material, the steps of mixing
   a. between 1 and 9 parts by weight on a dry basis of
      1. aqueous magnesium chloride having a specific gravity between 21.5 and 22.5° Baume,
      2. between 5 and 6.5 pounds magnesium oxide per gallon of aqueous magnesium chloride, and
      3. a surfactant with
   b. one part of the ingredients for synthetic resin foam and reacting the ingredients simultaneously to form a co-foamed product wherein the foam forming ingredient of the resin component is relied upon to produce all of the bubbles in the cofoam.

2. A method as in claim 1 wherein the synthetic resin is polyurethane.

3. A method as in claim 2 wherein the weight of the cement ingredients on a dry basis has a ratio to the weight of the polyurethane ingredients of between 1.5 and 9.0.

4. A method as in claim 1 wherein a filler is included in the co-foamed mixture.

5. Composition of matter comprising simultaneously co-foamed (a) magnesium oxychloride cement formed by mixing magnesium chloride in 21.5 to 22.5° Baume solution, 5 to 6.5 pounds magnesium oxychloride per gallon of magnesium chloride, and surfactant, and (b) synthetic resin in which the cement ingredients are present in an amount between 1 to 9 parts by weight on a dry basis per part of synthetic resin and wherein the foam forming ingredient of the resin component is relied upon to produce all of the bubbles in the cofoam.

6. A composition of matter as in claim 5 wherein the synthetic resin comprises polyurethane.

7. In a method of preparing a fire-resistant material, the steps of
1. preparing a mixture of
    a. aqueous magnesium chloride having a specific gravity between 21.5 and 22.5° Baume,
    b. a polyol or polyester precursor for polyurethane foam,
2. preparing a mixture of magnesium oxide in an amount between 5 and 6.5 pounds per gallon of magnesium chloride, a surfactant, and an isocyanate-containing precursor for polyurethane foam,
3. reacting the two mixtures to form a co-foamed fire-resistant product.

8. A method as in claim 7 wherein one of said mixtures contains a gaseous foaming agent for polyurethane foam.

* * * * *